US008599428B2

(12) United States Patent
Hasegawa (10) Patent No.: US 8,599,428 B2
(45) Date of Patent: Dec. 3, 2013

(54) OUTPUT DEVICE AND STORAGE MEDIUM STORING IMAGE PROCESSING PROGRAM

(75) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 375 days.

(21) Appl. No.: 13/019,925

(22) Filed: Feb. 2, 2011

(65) Prior Publication Data
US 2011/0228320 A1 Sep. 22, 2011

(30) Foreign Application Priority Data

Mar. 19, 2010 (JP) ................................ 2010-064621

(51) Int. Cl.
*G06K 15/00* (2006.01)
*G06F 3/12* (2006.01)

(52) U.S. Cl.
USPC .......... 358/1.18; 358/1.13; 358/1.6; 358/1.15

(58) Field of Classification Search
None
See application file for complete search history.

(56) References Cited

U.S. PATENT DOCUMENTS

| 2006/0050321 | A1 | 3/2006 | Takahashi |
| 2006/0132637 | A1 | 6/2006 | Imanura |
| 2008/0231872 | A1 | 9/2008 | Sugahara et al. |
| 2009/0033754 | A1 | 2/2009 | Yoshikawa |
| 2009/0244394 | A1 | 10/2009 | Hasegawa et al. |
| 2009/0268225 | A1 | 10/2009 | Sugiyama |

FOREIGN PATENT DOCUMENTS

| CN | 101572767 A | 11/2009 |
| EP | 1783998 A1 | 5/2007 |
| JP | H11-266421 A | 9/1999 |
| JP | 4081736 B2 | 3/2001 |
| JP | 2001-117747 A | 4/2001 |
| JP | 2005-130254 A | 5/2005 |
| JP | 2006-174189 A | 6/2006 |
| JP | 2008-087335 A | 4/2008 |
| JP | 2008-236454 A | 10/2008 |
| JP | 2009-038649 A | 2/2009 |
| JP | 2009-241545 A | 10/2009 |
| JP | 2010-141517 A | 6/2010 |
| WO | 2006/064941 A1 | 6/2006 |

OTHER PUBLICATIONS

European Patent Office, extended European Search Report for European Patent Application No. 11250112.7 (counterpart to above-captioned patent application), dated Dec. 2, 2011.
The State Intellectual Property Office of the People's Republic of China, Notification of First Office Action in counterpart Chinese Patent Application No. 201110056933.9 issued Apr. 24, 2013.

*Primary Examiner* — Dov Popovici
(74) *Attorney, Agent, or Firm* — Baker Botts L.L.P.

(57) ABSTRACT

A data acquiring unit acquires imaging data generated by an imaging device. The imaging data represents a still image or a motion image. The motion image is configured of a plurality of frame images that are chronologically in succession with one another. An image processing unit executes a first process for the still image to output the still image according to a first layout and a second process for the motion image. The second process is different from the first process. The image processing unit outputs, according to the first layout, one frame image in the plurality of frame images of the motion image when the imaging data representing the motion image satisfies a prescribed condition.

11 Claims, 5 Drawing Sheets

MOTION IMAGE OUTPUT LAYOUT

STILL IMAGE OUTPUT LAYOUT

OUTPUT DEVICE AND STORAGE MEDIUM STORING IMAGE PROCESSING PROGRAM

CROSS REFERENCE TO RELATED APPLICATION

This application claims priority from Japanese Patent Application No. 2010-064621 filed Mar. 19, 2010. The entire content of the priority application is incorporated herein by reference.

TECHNICAL FIELD

The present invention relates to an output device and a non-transitory computer-readable storage medium storing a set of program instructions installed on and executed by an outputting device for outputting an image representing the content of imaging data.

BACKGROUND

Imaging devices capable of capturing both still images and motion images are currently in widespread use. These imaging devices include digital still cameras having not only a function for capturing still images, but also a function for capturing motion image; and digital motion image cameras having not only a function for capturing motion image, but also a function for capturing still images. In order to print images representing the content of imaging data generated by such imaging devices, Japanese Patent Application Publication No. 2005-130254 discloses a technology for determining whether the imaging data represents a still image or motion image based on the file structure and for processing the imaging data differently based on this determination.

SUMMARY

However, in some cases, the user of one of the imaging devices described above may accidentally capture a subject as motion image despite intending to capture the subject as a still image. In such cases, the above technology treats the captured data as data representing a motion image. Accordingly, the user must perform complex operations in order to print the content of the captured motion image data as data representing a still image.

In view of the foregoing, it is an object of the present invention to provide an outputting device and a non-transitory computer-readable storage medium storing a set of program instructions capable of suitably processing data captured as motion image when the user of the imaging device intended to capture a still image.

In order to attain the above and other objects, the present invention provides an output device including a processor configured to execute instructions that cause the processor to provide functional units. The functional units includes: a data acquiring unit, and an image processing unit. The data acquiring unit acquires imaging data generated by an imaging device. The imaging data represents a still image or a motion image. The motion image is configured of a plurality of frame images that are chronologically in succession with one another. The image processing unit executes a first process for the still image to outputs the still image according to a first layout and a second process for the motion image. The second process is different from the first process. The image processing unit outputs, according to the first layout, one frame image in the plurality of frame images of the motion image when the imaging data representing the motion image satisfies a prescribed condition.

According to another aspect, the present invention provides a non-transitory computer-readable storage medium storing a set of program instructions installed on and executed by an output device. The set of program instructions includes: acquiring imaging data generated by an imaging device, the imaging data representing a still image or a motion image, the motion image being configured of a plurality of frame images that are chronologically in succession with one another; executing a first process for the still image to outputs the still image according to a first layout and a second process for the motion image, the second process being different from the first process; and outputting, according to the first layout, one frame image in the plurality of frame images of the motion image when the imaging data representing the motion image satisfies a prescribed condition.

DETAILED DESCRIPTION

[1. General Configuration]

Figure 1:
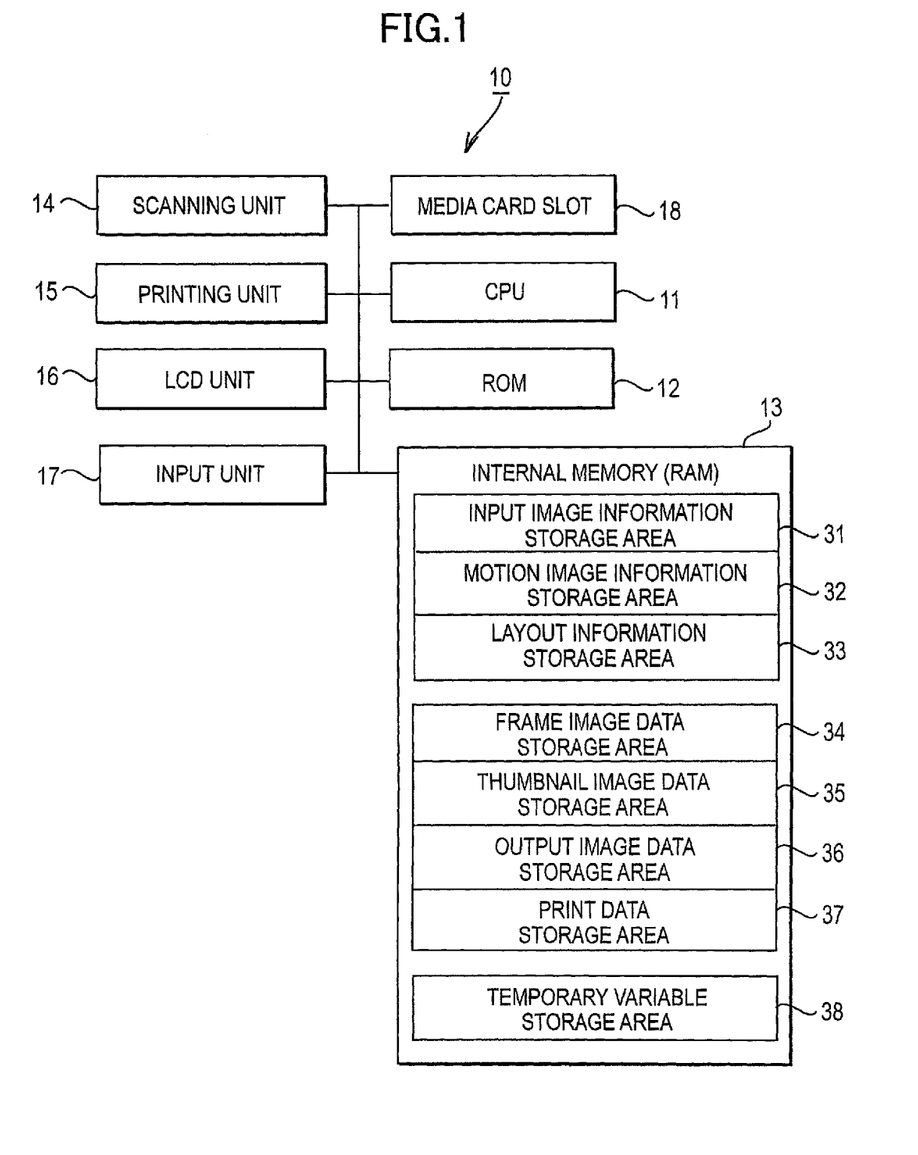
FIG. 1 is a block diagram illustrating an electrical configuration of a multifunction device according to an embodiment of the present invention.

First, a general configuration of a multifunction device 10 (hereinafter referred to as "MFD 10") according to an embodiment of the present invention will be described with reference to FIG. 1.

The MFD 10 is provided with various functions, including a printer function, a scanner function, and a color copier function. As shown in FIG. 1, the MFD 10 is provided with a CPU 11, a ROM 12, an internal memory (RAM) 13, a scanning unit 14, a printing unit 15, an LCD unit 16, an input unit 17 and a media card slot 18 that are interconnected with one another by signal lines.

The CPU 11 performs all computations for the MFD 10. The ROM 12 is prestored with programs that the CPU 11 executes in order to implement processes (shown in FIGS. 6 to 9) described later. The RAM 13 temporarily stores results of computations performed by the CPU 11, inputted data, and the like. Details of the RAM 13 will be described later.

The printing unit 15 prints image data to which a print command has been issued. The printing unit 15 can print images in color using toner or ink of four colors: cyan, magenta, yellow and black.

The LCD unit 16 displays images (including images of character strings for messages) on a compact color liquid crystal display.

The input unit 17 has various operating keys that a user can press, and inputs information based on the pressed keys. More specifically, the input unit 17 includes an Up key, a Down key, a Left key, and a Right key for moving a cursor up, down, left, and right; and an OK key for accepting a selection (all keys are not shown).

The media card slot 18 accepts the insertion of various media cards, such as a secure digital (SD) card or a Compact-Flash (CF) card (i.e., nonvolatile flexible storage media). These media cards are used in imaging devices, such as digital still cameras and digital motion image cameras capable of capturing still images and motion images, and serve to store imaging data generated by these imaging devices (image data representing still images or motion images). The MFD 10 also has a direct print function for directly reading imaging data from a media card inserted in the media card slot 18 and printing images represented by the imaging data.

Figure 2:
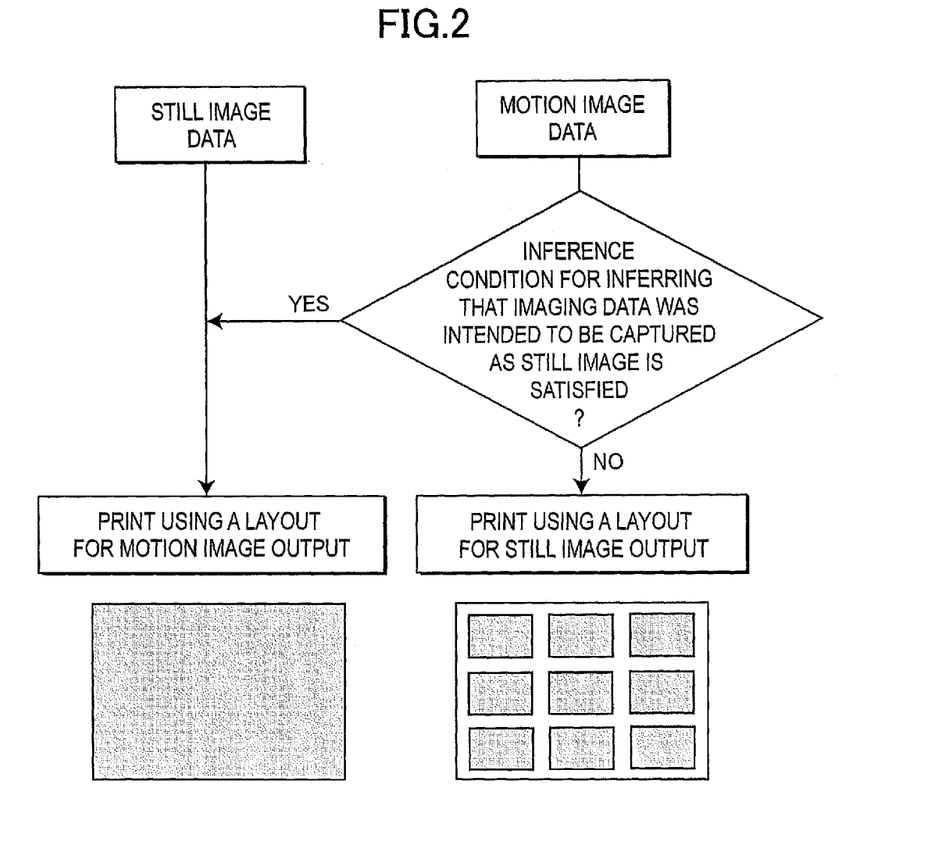
FIG. 2 is an explanatory diagram showing an outline of a process for printing an image representing a content of imaging data.

The imaging data targeted by the direct printing function is not only still image data representing still image, but also motion image data representing motion image configured of a plurality of frame images that are chronologically in succession with one another. As shown in FIG. 2, when the imaging data targeted for printing is still image data, the MFD 10 prints the still image represented by the still image data according to a layout in which only the still image represented by the still image data is laid out in a single-page output image (hereinafter referred to as the "layout for still image output").

On the other hand, when the imaging data targeted for printing is motion image data, the MFD 10 extracts a predetermined number (nine in the present embodiment) of frame images constituting the motion image represented by this motion image data, generates a frame layout image in which the extracted frame images are arranged chronologically within a single-page output image (hereinafter referred to as the "layout for motion image output"), and subsequently prints the frame layout image. Here, the nine frame images extracted by the MFD 10 include the first and last frame images among all frame images constituting the motion image, and seven frame images between the first and last frame images at positions dividing the motion image into eight equal segments (or at approximate positions when the total number of frame images cannot be divided evenly). Hence, the MFD 10 extracts nine frame images that are spaced at equal intervals in the motion image and ordered chronologically.

However, in some exceptional cases, the user of the imaging device may have intended to capture the subject as a still image, even though the imaging data targeted for printing is motion image data. If the MFD 10 infers that the motion image data in question was intended to be a still image (i.e., if an inference condition is met), the MFD 10 extracts only one representative frame image (the first frame image in the present embodiment) from among all frame images constituting the motion image represented by this motion image data, and prints the representative frame image in the layout for still image output. In the present embodiment, imaging data that satisfies the inference condition is motion image data for a motion image whose recording time falls within a prescribed time length. Hence, the MFD 10 infers that imaging data with a short recording time was taken with the intention of capturing a still image. The inference condition corresponds to a prescribed condition.

The MFD 10 is configured to display thumbnail images 81 (see FIG. 7) on the display unit 16. The thumbnail images 81 are of sufficient size for the user to discern the subject matter of the imaging data, enabling the user to select as a printing target imaging data representing a desired image from among a plurality of images represented by the imaging data stored on the media card. Once the user has selected a thumbnail image 81, the MFD 10 prints an image represented by the imaging data associated with the thumbnail image 81.

[2. Storage Areas in Internal Memory]

Next, storage areas of the RAM 13 will be described. As shown in FIG. 1, various storage areas are allocated in the RAM 13 to store information. These storage areas include an input image information storage area 31, a motion image information storage area 32, a layout information storage area 33, a frame image data storage area 34, a thumbnail image data storage area 35, an output image data storage area 36, a print data storage area 37, and a temporary variable storage area 38.

Figure 3:
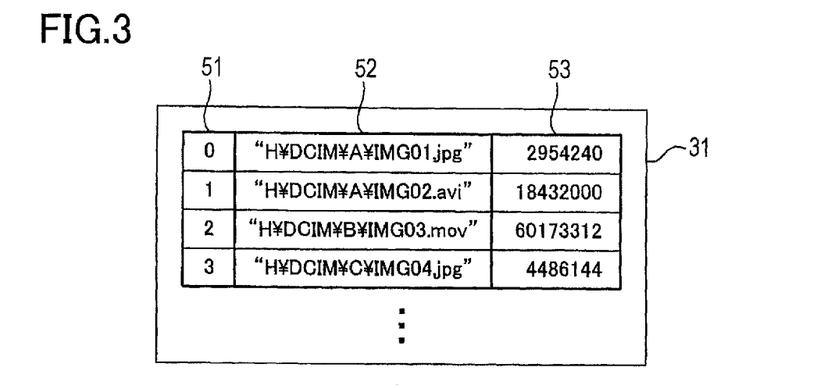
FIG. 3 is a view conceptually illustrating an input image information storage area of a RAM of the multifunction device in FIG. 1.

The input image information storage area 31 serves to store information on imaging data stored on a media card inserted in the media cart slot 18. More specifically, as shown in FIG. 3, the input image information storage area 31 is divided into an input image ID storage area 51, an input image filename storage area 52, and an input image file size storage area 53.

The input image ID storage area 51 serves to store IDs for a plurality of sets of imaging data stored on the media card. The IDs are assigned sequentially beginning from 0 based on the number of imaging data sets stored on the media card (hereinafter referred to as "input image IDs"). The input image IDs are assigned to the imaging data sets that have been read from the media card in such an order that the data sets have been read from the media card.

The input image filename storage area 52 is provided for storing filenames for the imaging data sets stored on the media card. In the present embodiment, each filename stored in the input image filename storage area 52 is systematically constructed of the full path to the corresponding imaging data set. For example, if a memory area of 256 bytes is provided for each filename, the MFD 10 stores character data (including information indicating no character) for 256 characters (at one byte per character).

The input image file size storage area 53 serves to store numerical values (values in units of kilobytes in this example) indicating the data sizes (file sizes) of the imaging data sets stored on the media card.

Figure 4:
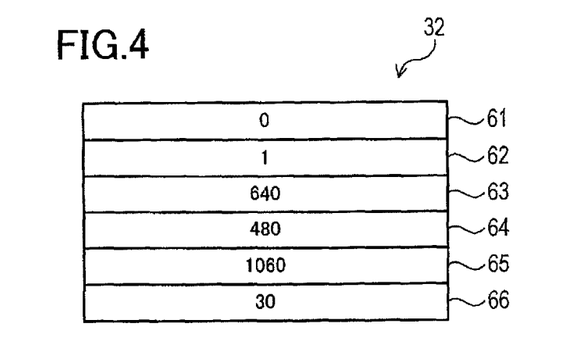
FIG. 4 is a view conceptually illustrating a motion image information storage area of the RAM.

The motion image information storage area 32 serves to temporarily store information read from the media card for a motion image data being processed. Specifically, as shown in FIG. 4, the motion image information storage area 32 is provided with a format type storage area 61, a codec type storage area 62, a horizontal size storage area 63, a vertical size storage area 64, a total frame number storage area 65 and an FPS information storage area 66.

The format type storage area 61 stores data of a type of file format for the motion image data being processed. In the present embodiment, the format type storage area 61 may store one of the values 0, 1 and 2 that have been preassigned to one of three file formats: 0 for AVI format, 1 for MOV format and 2 for MPEG format.

The codec type storage area 62 stores data of a type of codec for the motion image file being processed. In the present embodiment, the codec type storage area 62 may store one of the values 0, 1 and 2 that have been preassigned to one of three types of codecs: 0 for MotionJPEG codec, 1 for MPEG1 codec and 2 for DivX codec.

The horizontal size storage area 63 stores a numerical value indicating a number of pixels in a horizontal direction in each frame image constituting the motion image data being processed.

The vertical size storage area 64 stores a numerical value indicating a number of pixels in a vertical direction in each frame image constituting the motion image data being processed.

The total frame number storage area 65 stores a numerical value indicating a total number of frame images (number of frames) constituting the motion image data being processed.

The FPS information storage area 66 stores frames per second (FPS) information indicating the number of frames that should be produced each second when playing back the motion image represented by the target motion image data.

Returning to FIG. 1, the layout information storage area 33 functions to store layout information for generating output image data from the imaging data. A layout data storage area 33 is provided for each type of layout. In the present embodiment, there are two types of layouts, including a layout for motion image output and a layout for still image output.

Figure 5:
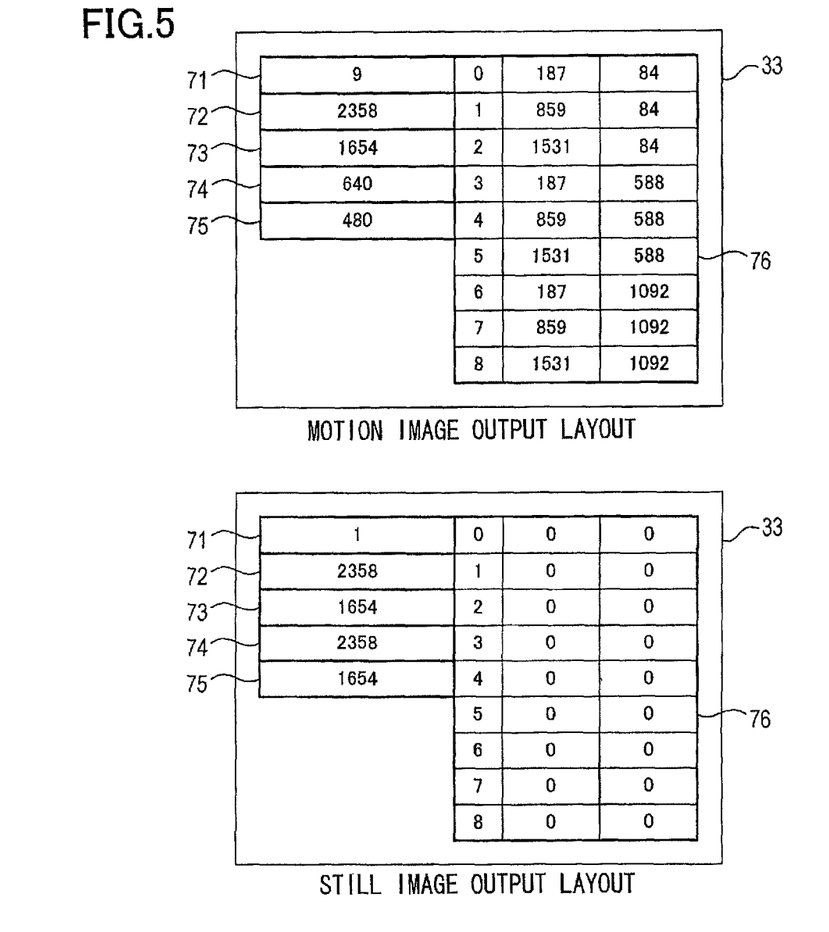
FIG. 5 is a view conceptually illustrating a layout information storage area of the RAM.

As shown in FIG. 5, the layout information storage area 33 includes a layout image number storage area 71, a horizontal output image size storage area 72, a vertical output image size storage area 73, a horizontal layout region size storage area 74, a vertical layout region size storage area 75, and a layout coordinate information storage area 76.

The layout image number storage area 71 stores the number of images that are laid out in a single-page output image. In the present embodiment, the value "9" is stored in the layout image number storage area 71 as the number of images in the layout for motion image output, and "1" is stored as the number of images in the layout for still image output.

The horizontal output image size storage area 72 stores a numerical value indicating the horizontal pixel size of the output image, where the output image is the image resulting from arranging one or a plurality of images on one page. The vertical output image size storage area 73 stores a numerical value indicating the vertical pixel size of the output image.

The horizontal layout region size storage area 74 stores a numerical value indicating the horizontal pixel size of a region in the one-page output image in which one image is arranged. In the present embodiment, only one value is stored since the layout region for all images in the motion image output layout are the same size, but a plurality of values may be stored when the size of each region varies according to each image. This point is shared with the vertical layout region size storage area 75 described next.

The vertical layout region size storage area 75 stores a numerical value indicating the vertical pixel size of a region in the one-page output image in which one image is arranged.

The layout coordinate information storage area 76 stores the coordinates for each image laid out in the single-page output image. In the present embodiment, each image is laid out on the page by aligning pixel positioned in the top left of the image with the corresponding layout coordinates stored in the layout coordinate information storage area 76.

The above storage areas are allocated in the RAM 13 since the information stored in these areas may be generated dynamically, but the information being stores is predetermined.

Returning to FIG. 1, the frame image data storage area 34 functions to store frame image data (a plurality of sets of frame image data?) extracted from motion image data. The frame image data stored in the frame image data storage area 34 is compressed according to a specific format (the JPEG format or MPEG format) based on the type of motion image data.

The thumbnail image data storage area 35 is provided for temporarily storing thumbnail image data representing thumbnail images 81 displayed on the display unit 16 to allow a user to select desired imaging data to print.

The output image data storage area 36 is provided for temporarily storing output image data representing an output image (a printing image) based on the imaging data. Specifically, the output image based on still image data is configured of a single image. Thus, image data representing this single image is laid out in the entire output image data storage area 36. An output image based on motion image data, on the other hand, is configured of nine images. Therefore, image data representing each frame image is respectively laid out in nine evenly-divided layout regions within the output image data storage area 36.

The print data storage area 37 serves to temporarily store image data (CMYK binary image data or the like) for actually printing the image represented by the output image data.

The temporary variable storage area 38 temporarily stores variables, counters, and other information.

[3. Process Executed by the CPU 11]

Figure 6:
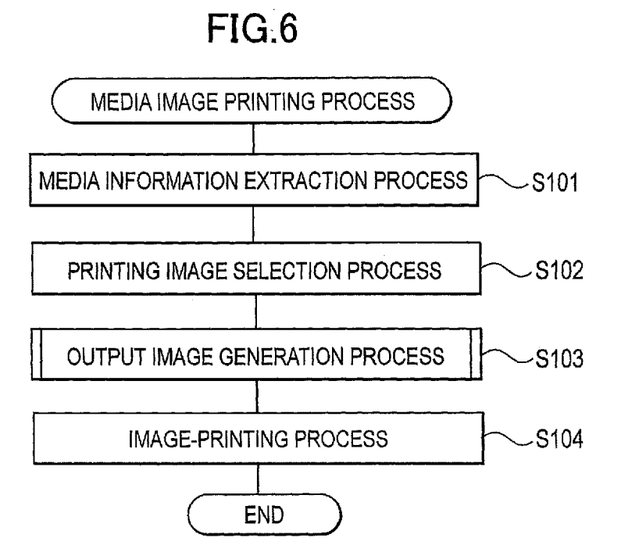
FIG. 6 is a flowchart of a media image printing process executed by a CPU of the multifunction device.

The CPU 11 executes a media image printing process of FIG. 6 when the user performs an operation on the input unit 17 to select a 'media image printing mode' while a media card storing a plurality of sets of imaging data is inserted in the media card slot 18. The media image printing process executed by the CPU 11 will be described while referring to a flowchart of FIG. 6.

In S101 at the beginning of this media image printing process, the CPU 11 executes a media information extraction process. Specifically, the CPU 11 reads information (a filename and a file size) for each imaging data set stored in the media card, and stores the read information, sequentially in association with an input image ID indicative of the order that the imaging data set has been read, in the input image filename storage area 52 and the input image file size storage area 53 of the input image information storage area 31. In the media information execution process, the input image IDs beginning from 0 are respectively stored in the input image ID storage area 51.

In S102 the CPU 11 performs a printing image selection process to display on the display unit 16 thumbnail images 81 representing the content of the imaging data set stored on the media card and to prompt the user to select a desired file of imaging data set to print.

Figure 7:
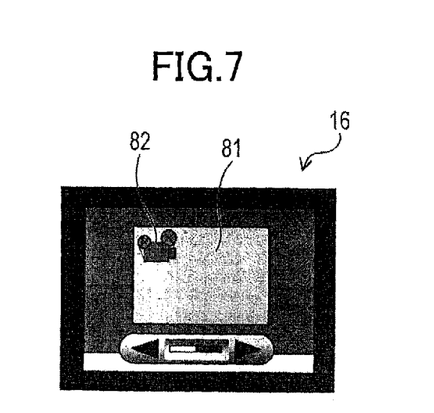
FIG. 7 is an explanatory diagram showing a thumbnail image displayed on a display unit of the multifunction device.

More specifically, as shown in FIG. 7, the CPU 11 displays one thumbnail image 81 on the display unit 16. Thereafter, the CPU 11 changes the thumbnail image 81 displayed on the display unit 16 to a thumbnail image 81 for other imaging data set based on user operations to press the up, down, left, or right keys in the input unit 17. When the user presses an OK key, the CPU 11 selects the imaging data set corresponding to the thumbnail image 81 displayed at the time the OK key was pressed as the printing target.

In the case of motion image data in the present embodiment, the CPU 11 displays the first frame image of the motion image data as the thumbnail image 81 and displays an icon 82 at a prescribed position (the upper left position in the thumbnail image 81, as shown in the example of FIG. 7) to indicate that the data is motion image data. In the case of still image data, the CPU 11 simply displays the still image as the thumbnail image 81 (without displaying the icon 82).

The image data representing the thumbnail image 81 is generated by reducing the original image (the still image or the first frame image of a motion image) and stored in the thumbnail image data storage area 35. Subsequently, the thumbnail image 81 represented by this image data is displayed on the display unit 16.

In S103 the CPU 11 executes an output image generation process to generate output image data representing an output image based on the imaging data set selected in S102 as the printing target. The output image generation process will be described next in greater detail with reference to the flowchart in FIG. 8.

Figure 8:
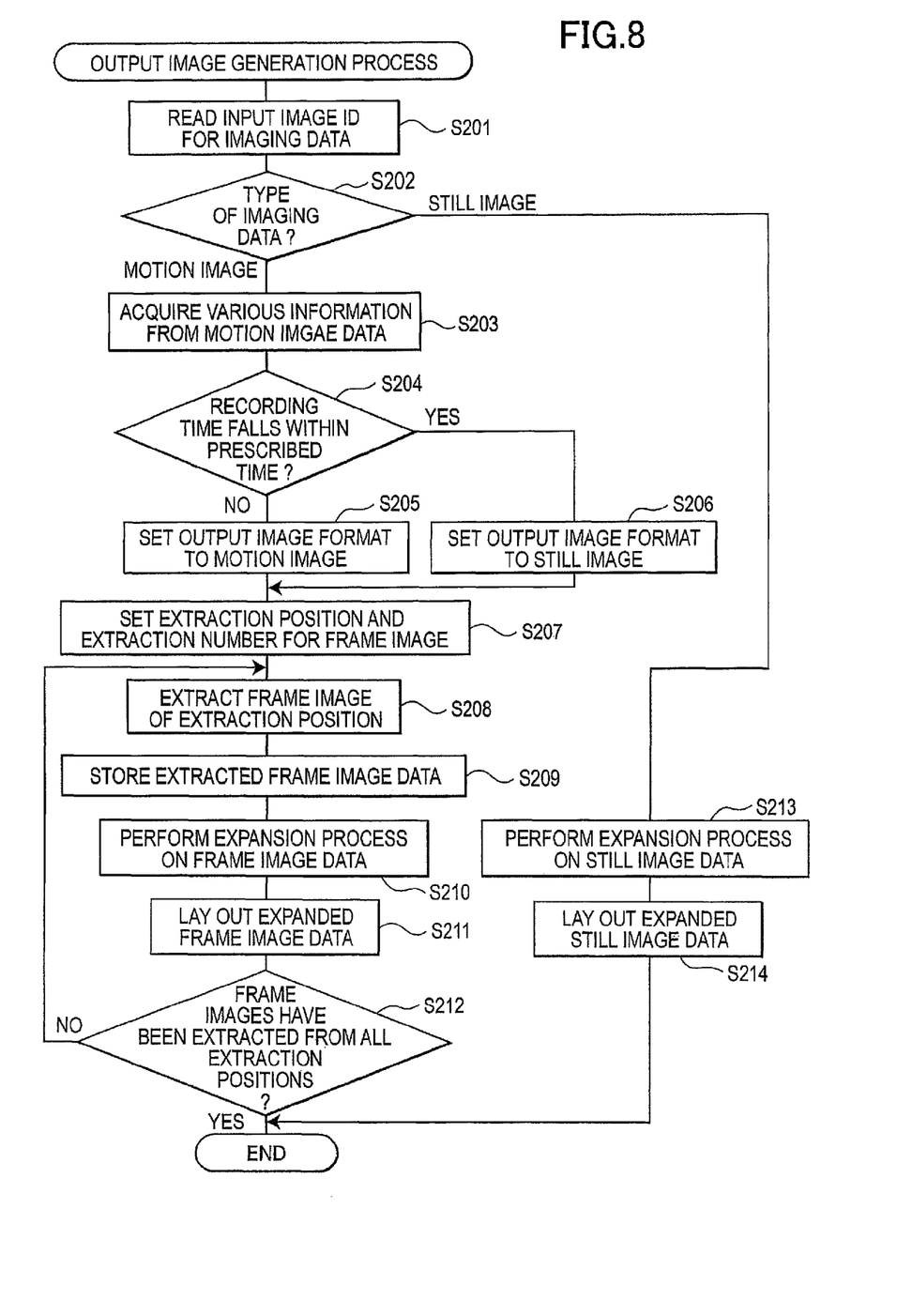
FIG. 8 is a flowchart of an output image generation process executed during the print image selection process of FIG. 7.

In S201 at the beginning of the output image generation process in FIG. 8, the CPU 11 reads the input image ID for the imaging data set targeted for printing from the input image ID storage area 51. In S202 the CPU 11 determines whether the type of imaging data set associated with the input image ID read in S201 is classified as either still image data or motion image data by referencing header information in the input image ID. For example, still image data compressed in the JPEG format begins with the hexadecimal header "FFD8," while motion image data in the AVI format begins with the character string "RIFF." Hence, by analyzing the first few bytes of the imaging data, the CPU 11 can determine the type of data.

However, the CPU 11 may determine the type of imaging data set based on an extension of the filename for the imaging data set, for example, and the present embodiment is not limited to the method of determination described above. However, since there is a possibility that the information stored in the file may not match the extension, analyzing the first few bytes of the imaging data set as described in the embodiment is the preferred method of determination.

If the CPU 11 determines in S202 that the type of imaging data set is motion image data, in S203 the CPU 11 acquires various information from this motion image data. Specifically, the CPU 11 acquires the format type information, codec type information, horizontal size information, vertical size information, total frame number information, and FPS information related to the motion image. The various acquired information is stored respectively in the format type storage area 61, codec type storage area 62, horizontal size storage area 63, vertical size storage area 64, total frame number storage area 65, and FPS information storage area 66 of the motion image information storage area 32. Generally, these parameters are included in the header of the motion image data or the like.

In S204 the CPU 11 determines whether the recording time of the motion image represented by the motion image data falls within a prescribed time (two seconds in the present embodiment). The recording time is calculated according to the following equation.

Recording Time=Total Frame Number/*FPS*

The prescribed time in the present embodiment has been set to two seconds, which is an experimentally and empirically determined value, but the present embodiment is not limited to this value.

If the CPU 11 determines in S204 that the recording time of the motion image does not fall within the prescribed time, in S205 the CPU 11 sets the output image format of this motion image data to "motion image" and reads layout information from the layout information storage area 33 for the motion image output layout. Subsequently, the CPU 11 advances to S207.

However, if the CPU 11 determines in S204 that the recording time for the motion image represented by this motion image data falls within the prescribed time, in S206 the CPU 11 sets the output image format for this motion image data to "still image" and reads layout information from the layout information storage area 33 for the still image output layout. Subsequently, the CPU 11 advances to S207.

In S207 the CPU 11 sets an extraction position and extraction number for frame images according to the layout information of the output image format set in S205 or S206 and stores this position and number in the temporary variable storage area 38. More specifically, in the case of the motion image output layout, the CPU 11 sets extraction positions (frame images to extract) to a total of nine frame images including the first frame image, the last frame image, and seven equally spaced frame images that divide the total number of frames in the motion image data between the first and last frame images into eight equal segments. That is, the CPU 11 sets extraction positions based on a value obtained by dividing the "total frame number−1" by the "extraction frame number−1" (9−1=8). If "total frame number−1" is indivisible by "extraction frame number−1," the extraction positions may be set to frame images approaching these values (such as the frame number corresponding to the value obtained after rounding off numbers to the right of the decimal).

When using the layout for still image output, the CPU 11 sets the extraction position only to the first frame image in the motion image data.

In S208 the CPU 11 extracts data for one frame image corresponding to one extraction position, from the extraction positions set in S207, for which frame image data has yet to be extracted.

In S209 the CPU 11 stores the frame image data extracted in S208 (the compressed image data that has yet to be expanded) in the frame image data storage area 34. In S210 the CPU 11 performs an expansion process on the frame image data that was stored in the frame image data storage area 34 in S209 to convert the frame image data into a format that enables pixel calculations (image data representing RGB values for each pixel within the range 0-255).

In S211 the CPU 11 lays out (stores) the expanded frame image data in the output image data storage area 36 according to the layout information read from the layout information storage area 33 in S205 or S206.

In S212 the CPU 11 determines whether data for frame images have been extracted from all extraction positions set in S207 and laid out in the output image data storage area 36. To describe this in more detail, a counter set to an initial value of "0" is stored in the temporary variable storage area 38 at the beginning of the output image generation process. This counter is incremented by one each time the process in S208-S211 is performed. Thus, the CPU 11 can determine in S212 that all frame images have been laid out in the output image data storage area 36 when this counter value reaches the extraction number for frame images set in S207.

The CPU 11 returns to S208 when determining in S212 that there remain frame images to lay out in the output image data storage area 36 and ends the output image generation process upon determining that all frame images have been laid out. At this point, the image data stored in the output image data storage area 36 is output image data generated based on the motion image data.

On the other hand, if the CPU 11 determines in S202 that the type of imaging data set is still image data, then in S213 the CPU 11 executes the expansion process on this still image data to convert the data into a format in which pixels can be calculated, as described above for the process in S210.

In S214 the CPU 11 lays out the expanded image data in the output image data storage area 36 according to the layout for still image output, and subsequently ends the output image generation process. At this time, the image data stored in the output image data storage area 36 is output image data generated based on still image data.

Returning to the flowchart in FIG. 6, in S104 the CPU 11 executes an image-printing process for printing an image represented by the output image data stored in the output image data storage area 36. In this process, the CPU 11 copies the output image data stored in the output image data storage area 36 to the print data storage area 37 in single line units, performs a color conversion process (RGB→CMYK) and thresholding (binarization) process on each line unit of data, and outputs the result to the print controlling unit 15. Upon receiving the data, the print controlling unit 15 executes a printing operation based on the binary data. Subsequently, the media card image printing process ends.

[4. Effects]

As described above, the MFD 10 according to the present embodiment prints a still image according to the still image output layout when the imaging data set is still image data, and prints a plurality of frame images constituting a motion image that are arranged according to the motion image output layout when the imaging data set is motion image data. However, even though the imaging data set is motion image data, the MFD 10 may infer that the imaging data set was intended to be captured as a still image when the recording time of the motion image falls within the prescribed time. In such cases, the MFD 10 selects the first frame image of the motion image as a representative frame image and prints this image according to the still image output layout.

With this configuration, the MFD 10 according to the present embodiment can print an image representing the content of imaging data set captured as a motion image according to the still image output layout when the user of the imaging device intended to capture the subject as a still image. Hence, the MFD 10 can treat an image represented by the imaging data set captured as a motion image just like imaging data set representing a still image.

More particularly, the MFD 10 of the present embodiment is configured to infer that imaging data set with a short recording time was intended to be captured as a still image. Hence, the MFD 10 can infer whether imaging data set representing a motion image was intended to be captured as a still image based on the motion image itself. In other words, the user of the imaging device will likely stop filming upon realizing that he or she has mistakenly begun to film the subject as motion image when the intention was to capture the subject as a still image. In such cases, the recording time of the motion image will normally be quite short. Thus, the MFD 10 can infer that the user's intention was to capture a still image when the recording time of the motion image falls within the prescribed time.

In addition, when the user of the imaging device accidentally captured a motion image when intending to capture a still image, the first frame image, i.e., the image at the beginning of the motion image, likely corresponds to the image that the user intended to capture as a still image. Accordingly, the MFD 10 according to the present embodiment extracts as a representative frame image the first frame image from motion image data satisfying the inference condition, and prints only this representative frame image according to the still image output layout, thereby printing the most suitable image in the motion image.

[5. Variations of the Embodiment]

While the invention has been described in detail with reference to specific embodiments thereof, it would be apparent to those skilled in the art that many modifications and variations may be made therein without departing from the spirit of the invention, the scope of which is defined by the attached claims.

In the present embodiment described above, the inference condition for inferring that the user intended to capture imaging data as a still image requires that the recording time of the motion image fall within the prescribed time. Thus, when imaging data satisfies this inference condition, the MFD 10 infers that the user intended to capture a still image (S204), but the present embodiment is not limited to this inference condition.

For example, the MFD 10 may determine that imaging data satisfies the inference condition based on the total frame number information acquired in S203, and specifically when the total frame number of the motion image falls within a prescribed number.

As described above, the user of the imaging device will likely stop filming a motion image upon realizing that he or she has mistakenly begun to film the subject as motion image when the intention was to capture the subject as a still image. Since the total number of frames in this motion image will normally be very few, the MFD 10 can infer that the user's intention was to capture a still image when the total frame number of the motion image falls within the prescribed number. For example, the MFD 10 may determine that imaging data satisfies the inference condition when the total number of frames in the motion image does not meet the extraction frame number for the motion image output layout (nine in the present embodiment).

Alternatively, the MFD 10 may identify an amount of change among frame images constituting the motion image within a prescribed interval and may determine that the imaging data satisfies the inference condition when the amount of change within the prescribed interval falls within a prescribed amount.

For example, when the subject of the filming is a person, the person generally attempts to remain still when the user of the imaging device is capturing a still image. Accordingly, if the user of the imaging device mistakenly begins filming a motion image when intending to capture a still image, the subject of the filming will most likely remain still for at least a short time at the beginning of the motion image. Since the amount of change among frame images will be small during the prescribed interval that begins from the first frame image of the motion image, the MFD 10 can infer that the user intended to capture the subject as a still image when the amount of change among frame images is no greater than the prescribed amount within an interval that begins from the first frame image of the motion image and ends on a frame image positioned earlier than the last frame image (for example, the interval of fixed time length, such as two seconds, from the beginning of the motion image). However, it is not absolutely necessary for the interval to begin from the first frame image.

Specifically, the MFD 10 may calculate the amount of change between two consecutive frame images for all frame images within the prescribed interval and treat the sum of these changes as the amount of change among frame images within the prescribed interval. Here, the amount of change between frame images can be found by totaling the absolute difference between pixel values of each pixel in the two frame images, but the present embodiment is not limited to this method of calculation. For example, the difference between frame images may be calculated using the length of motion vectors in the images calculated according to a well-known optical flow method or the like.

However, these processes generate a great processing load. Therefore, the process may be simplified by considering the amount of change between the first and last frame images in the prescribed interval to be the amount of change among frame images in the prescribed interval. For example, the MFD 10 may calculate motion vectors according to the optical flow method or the like within only the first and last frame images of the prescribed interval. Further, if the data has been compressed according to MPEG-4 or another compression algorithm that uses the differences (vector lengths) between frame images, there is no need to bother calculating the differences between frame images.

Alternatively, the inference condition may be a plurality of AND conditions or OR conditions based on the recording time, total number of frames, and amount of change between frames described earlier, as well as other aspects. For example, the CPU 11 may determine that the imaging data satisfies the inference condition when the data has a recording time that falls within the prescribed time and the amount of change during the prescribed interval that falls within the prescribed amount. Further, the user may be allowed to select which of a plurality of conditions are to be applied.

Further, the inference condition is not limited to a condition on motion image represented by the imaging data. For example, the MFD 10 may execute a process to set an operating mode in response to a user operation so that imaging data is always treated as a still image, and may determine that imaging data satisfies the inference condition when this setting has been established for the imaging data in question.

As described above, the user selects imaging data to be printed based on thumbnail images 81 displayed on the display unit 16. However, when selecting imaging data, the user may also be allowed to modify print settings. In addition to the common settings for paper size, paper type, and printing quality, for example, the MFD 10 also provides a setting called "Always print as still image (ON/OFF)." Thus, when the "Always print as still image" setting is set to ON for specific imaging data, the MFD 10 prints this imaging data according to the still image output layout, whether the data has characteristics of a motion image or not. In this way, the MFD 10 can infer that the user had intended to capture, the imaging data as a still image, even when the imaging data has the characteristics of a motion image.

It may also be possible to perform the "Always print as still image (ON/OFF)" setting on the imaging device itself. In this case, the MFD 10 would acquire information indicating the settings made on the imaging device and print any imaging data having the "Always print as still image" setting set to ON according to the still image output layout, regardless of whether the imaging data has the characteristics of a motion image. Accordingly, the same effects can be obtained as when the setting is made on the MFD 10.

In the present embodiment described above, the MFD 10 extracts the first frame image from motion image data that satisfies the inference condition as a representative frame image and prints only the representative frame image according to the still image output layout. However, the MFD 10 may extract a frame image other than the first frame image to be used as the representative frame image.

In the present embodiment described above, the MFD 10 displays the first frame image of motion image data as the thumbnail image 81 and additionally displays the icon 82 in the upper left corner of the thumbnail image 81 for indicating that the data is motion image data (see FIG. 7). However, the output image (the nine frame images) according to the motion image output layout may be displayed as the thumbnail image (print preview), for example.

In the present embodiment described above, nine frame images are arranged chronologically on a one-page output image as an example of the motion image output layout. However, a plurality of frame images may be laid out so as to overlap one another, without regard to the chronological sequence, for example.

In the present embodiment described above, the MFD 10 prints a still image according to the still image output layout when the imaging data is still image data and prints a plurality of frame images from a motion image according to the motion image output layout when the imaging data is motion image data, but the present embodiment is not limited to this method. For example, even when the user performs a printing operation for motion image data (an operation to select motion image data as the printing target), the MFD 10 may be configured not to print nine frame images associated with the motion image as a rule, and only to print a representative frame image from the motion image according to the still image output layout as an exception when the motion image data satisfies the inference condition.

In the present embodiment described above, the present embodiment is applied to the MFD 10 as one example of the image-outputting device, but the present embodiment is not limited to this device. For example, the present embodiment may be applied to a printing device other than a multifunction device, such as a printing device without a scanner function, and is not limited to a printing device, but may be applied to a device that outputs images representing the content of imaging data generated by an imaging device that can capture both still images and motion image. In other words, the scope of image output covers not only printing images, but also displaying images, for example. Accordingly, the present embodiment may also be applied to a data processor, such as a personal computer, and a program executed on the data processor, for example.

What is claimed is:

1. An output device comprising:
a storage device storing computer readable instructions;
a processor configured to execute the computer readable instructions that cause the processor to implement processes, comprising:
acquiring unit that acquires imaging data generated by an imaging device, the imaging data representing a still image or a motion image, the motion image being configured of a plurality of frame images that are chronologically in succession with one another;
acquiring information from the imaging data representing the motion image;
determining whether or not the imaging data representing the motion image satisfies a prescribed condition based on the information acquired from the imaging data; and
executing a first process for the still images so as to output respective single still images according to a first layout for outputting the respective single still images, executing the first process to output one frame image of the plurality of frame images of the motion image according to the first layout when the imaging data representing the motion image satisfies the prescribed condition, and executing a second process for motion images for extracting a respective predetermined number, more than one, of frame images constituting a respective motion image and generating a second layout for outputting the respective predetermined number of frame images when the imaging data representing the motion image fails to satisfy the prescribed condition, the second process being different from the first process.

2. The output device according to claim 1, wherein the computer readable instructions cause the processor to further implement calculating a recording time of the motion image represented by the imaging data based on FPS information and a total frame number, the FPS information indicating a number of frames produced each second when playing back the motion image, the total frame number being a total number of frame images constituting the motion image, and wherein the imaging data representing the motion image satisfies the prescribed condition when the recording time of the motion image falls within a prescribed time.

3. The output device according to claim 1, wherein the computer readable instructions cause the processor to further implement identifying a total frame number of the motion image represented by the imaging data, and wherein the imaging data representing the motion image satisfies the prescribed condition when the total frame number of the motion image falls within a prescribed number.

4. The output device according to claim 1, wherein the computer readable instructions cause the processor to further implement identifying an amount of change among some frame images in the plurality of frame images within a prescribed interval, and wherein the imaging data representing the motion image satisfies the prescribed condition when the amount of change falls within a prescribed amount.

5. The output device according to claim 4, wherein the plurality of frame images comprising a first frame image positioned at the beginning of the motion image, a last frame image positioned at the end of the motion image, and at least one frame image positioned between the first frame image and the last frame image, wherein the prescribed interval begins from the first frame image and ends on a frame image in the at least one frame image.

6. The output device according to claim 4, wherein the some frame images comprising a first frame image positioned at the beginning of the some frame images and a last frame image positioned at the end of the some frame images, and wherein the identifying identifies the amount of change of the first frame image and the last frame image.

7. The output device according to claim 1, wherein the computer readable instructions cause the processor to further implement acquiring an operation mode for the imaging data representing the motion image in response to a user operation, the operation mode indicating that the imaging data representing the motion image is always treated as the still image, and wherein the imaging data representing the motion image satisfies the prescribed condition when the imaging data representing the motion image is set to the operating mode.

8. The output device according to claim 1, wherein the one frame image is a first frame image positioned at the beginning of the motion image.

9. The output device according to claim 1, wherein the executing prints the still image in order to output the still image, prints the one frame image in order to output the one frame image, and prints the respective predetermined number of frame images in order to output the respective predetermined number of frame images.

10. The output device according to claim 1, wherein the acquiring information acquires the information from a header of the imaging data representing the motion image.

11. A non-transitory computer readable storage medium storing a set of program instructions installed on and executed by an output device, the set of program instructions comprising:

acquiring imaging data generated by an imaging device, the imaging data representing a still image or a motion image, the motion image being configured of a plurality of frame images that are chronologically in succession with one another;

acquiring information from the imaging data representing the motion image;

determining whether or not the imaging data representing the motion image satisfies a prescribed condition based on the information acquired from the imaging data; and executing a first process for still images so as to output respective single still images according to a first layout for outputting the respective single still images, executing the first process to output one frame image of the plurality of frame images of the motion image according to the first layout when the imaging data representing the motion image satisfies the prescribed condition, and executing a second process for motion images for extracting a respective predetermined number, more than one, of frame images constituting a respective motion image and generating a second layout for outputting the respective predetermined number of frame images when the imaging data representing the motion image fails to satisfy the prescribed condition, the second process being different from the first process.

* * * * *